United States Patent
Jermstad et al.

(10) Patent No.: US 11,341,286 B2
(45) Date of Patent: May 24, 2022

(54) TAMPER SENSOR ASSEMBLY

(71) Applicant: TE CONNECTIVITY CORPORATION, Berwyn, PA (US)

(72) Inventors: Kenneth Jermstad, Hampton, VA (US); Michael Ritchie, Hampton, VA (US); Marcus Updyke, Portsmouth, VA (US); Anthony Ball, Virginia Beach, VA (US)

(73) Assignee: TE CONNECTIVITY SERVICES GMBH, Schaffhausen (CH)

( * ) Notice: Subject to any disclaimer, the term of this patent is extended or adjusted under 35 U.S.C. 154(b) by 885 days.

(21) Appl. No.: 16/166,585

(22) Filed: Oct. 22, 2018

(65) Prior Publication Data

US 2020/0125774 A1     Apr. 23, 2020

(51) Int. Cl.
| | | |
|---|---|---|
| G06F 21/00 | (2013.01) | |
| G06F 21/87 | (2013.01) | |
| H01L 23/00 | (2006.01) | |
| H05K 1/02 | (2006.01) | |
| H05K 1/03 | (2006.01) | |
| H05K 5/02 | (2006.01) | |

(52) U.S. Cl.
CPC .............. *G06F 21/87* (2013.01); *H01L 23/57* (2013.01); *H05K 1/0275* (2013.01); *H05K 1/0393* (2013.01); *H05K 5/0208* (2013.01); *H05K 5/0247* (2013.01); *H05K 2201/10151* (2013.01)

(58) Field of Classification Search
CPC ....... G06F 21/87; H01L 23/57; H05K 1/0275; H05K 1/0393; H05K 5/0208; H05K 5/0247; H05K 2201/10151
See application file for complete search history.

(56) References Cited

U.S. PATENT DOCUMENTS

| | | | |
|---|---|---|---|
| 5,285,734 A * | 2/1994 | MacPherson ........ | G08B 13/128 109/42 |
| 6,929,900 B2 | 8/2005 | Farquhar et al. | |
| 10,321,589 B2 * | 6/2019 | Dragone ................. | G06F 21/87 |
| 2002/0084090 A1 * | 7/2002 | Farquhar .............. | H05K 1/0275 174/541 |
| 2014/0028335 A1 | 1/2014 | Salle et al. | |
| 2018/0148241 A1 | 5/2018 | Gulas | |

FOREIGN PATENT DOCUMENTS

EP        1557736 A2     7/2005

OTHER PUBLICATIONS

Extended European Search Report, European Application No. 19204427. 9-1218, European Filing Date, Jan. 15, 2020.

* cited by examiner

*Primary Examiner* — Pete T Lee

(57) ABSTRACT

A tamper sensor assembly that includes a substrate with a protective bulk section including tamper circuitry and a hardware section configured to receive hardware circuitry and extending from the protective bulk section; the hardware circuitry electrically connected to the tamper circuitry to alter operation of the hardware circuitry responsive to modification of the tamper circuitry. The substrate additionally includes an attachment section extending from the hardware section. The tamper sensor assembly also includes a first fold in the substrate to position a first portion of the hardware section to extend along the protective bulk section, and a second fold in the substrate to position a second portion of the hardware section to extend along the first portion of the hardware section.

20 Claims, 4 Drawing Sheets

TAMPER SENSOR ASSEMBLY

BACKGROUND OF THE INVENTION

The subject matter herein relates generally to tamper sensor assemblies.

Tamper sensors and tamper sensor assemblies are provided to prevent direct physical access and/or intentional damage to sensitive hardware of a computing device. Specifically, while software is vulnerable to hackers, malware attacks, viruses, and the like, hardware components similarly can be attacked by individuals attempting to steal or destroy valuable information of an individual or company.

As a result of hardware based attacks, tamper sensors have been developed. Tamper sensors are coupled to hardware components and detect if an individual is attempting to physically access the hardware. The desired operation of such a tamper sensor is to detect when an individual is physically accessing, or tampering with the hardware.

However, individuals attempting to steal or destroy valuable information continually attempt to circumvent these sensors. Such individuals attempt to find any opening within the sensor to access the hardware. Specifically, any hardware component or portion of a hardware component not with a protective zone of a sensor assembly is vulnerable to attack allow the tamper sensor to be bypassed. Attempts at physical penetration through drilling, puncturing with a punch or laser, mechanical disassembly or the like are utilized to gain access to an individual's secrets. As a result, the Federal Information Processing Standard (FIPS) has been developed to rate the security of a computing device. Specifically, FIPS Publication 140-2 that is incorporated in full herein, specifically has provided ratings related to hardware and software security by providing four (4) levels of security within the standard.

Accordingly, there is a need for a tamper assembly that minimizes access to the hardware being protected. Also desired is a tamper assembly that is resistant to solvent based attacks and other attacks such that a level four (4) FIPS Publication rating will be provided for hardware utilizing the tamper assembly.

BRIEF DESCRIPTION OF THE INVENTION

In an embodiment, a tamper sensor assembly is provided that includes a substrate. The substrate includes a protective bulk section with tamper circuitry, a hardware section configured to receive hardware circuitry and extending from the protective bulk section; the hardware circuitry electrically connected to the tamper circuitry to alter operation of the hardware circuitry responsive to modification of the tamper circuitry, and an attachment section extending from the hardware section. The tamper sensor assembly also includes a first fold in the substrate to position a first portion of the hardware section to extend along the protective bulk section, and a second fold in the substrate to position a second portion of the hardware section to extend along the first portion of the hardware section.

In another embodiment, a method of manufacturing a tamper sensor assembly is provided that includes layering tamper circuitry on a substrate in a protective bulkhead section of the substrate. The method also provides placing hardware circuitry on the substrate in a hardware section of the substrate, and connecting the hardware circuitry to the tamper circuitry such that the tamper circuitry alters operation of the hardware circuitry when the tamper circuitry is modified. The substrate is folded a first time to extend a first portion of the hardware section along the protective bulkhead section of the substrate, and folded a second time to extend a second portion of the hardware section along the first portion of the hardware section of the substrate.

In another embodiment, a tamper sensor assembly is provided that includes a substrate with a protective bulk section having tamper circuitry and a hardware section having hardware circuitry extending from the protective bulk section, wherein the hardware circuitry is altered responsive to modification of the tamper circuitry. The tamper sensor assembly also includes a protective bulk section fold along an edge of the protective bulk section adjacent the hardware section to engage a first portion of the hardware section against the protective bulk section along a first engagement surface of the hardware section. The tamper sensor assembly additionally includes a hardware section fold in the hardware section to engage a second portion of the hardware section against the first portion of the hardware section along a second engagement surface of the hardware section opposite the first engagement surface of the hardware section to enclose the first portion of the hardware section.

DETAILED DESCRIPTION OF THE INVENTION

Embodiments set forth herein may include various tamper sensor assemblies. The tamper sensor assemblies may fit into computing devices, including but not limited to personal computers, laptop computers, smart devices, and the like. Similarly, hardware that is received within each tamper sensor assembly may include, central processing units, data storage or memories, cards, including graphic cards, sound cards, and memory cards, or the like.

In various embodiments, the tamper sensor assembly is a substrate that includes a protective bulk section, a hardware section and an attachment section. The substrate folds a first time to place the hardware section and attachment section against the protective bulk section. The substrate then folds a second time at the hardware section such that the hardware section fold on itself. The attachment section is then secured to the protective bulk section to enclose the hardware within the tamper sensor assembly.

Figure 1:
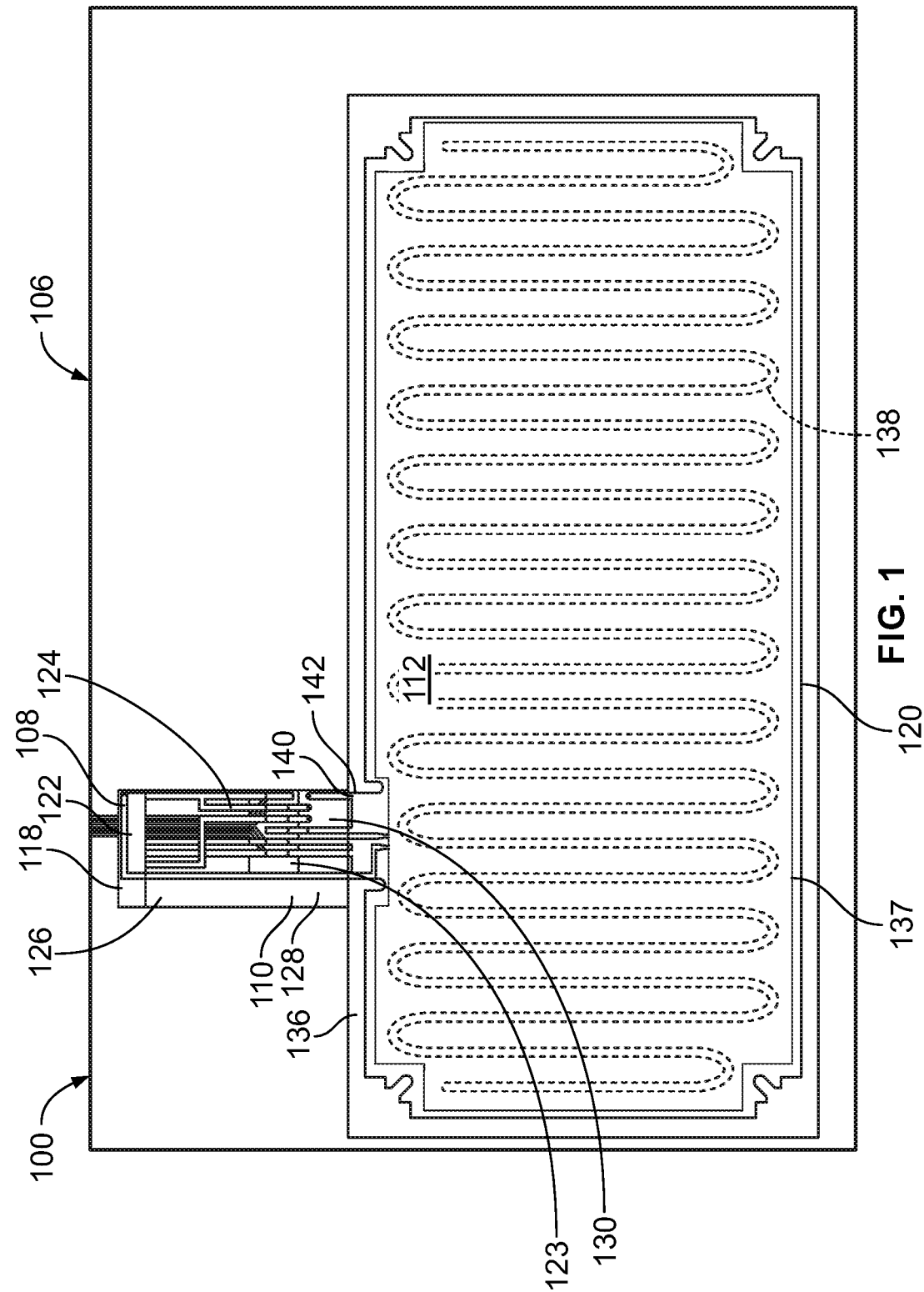
FIG. 1 is a top plan view of a tamper sensor assembly in an unfolded condition in accordance with an exemplary embodiment.
Figure 2:
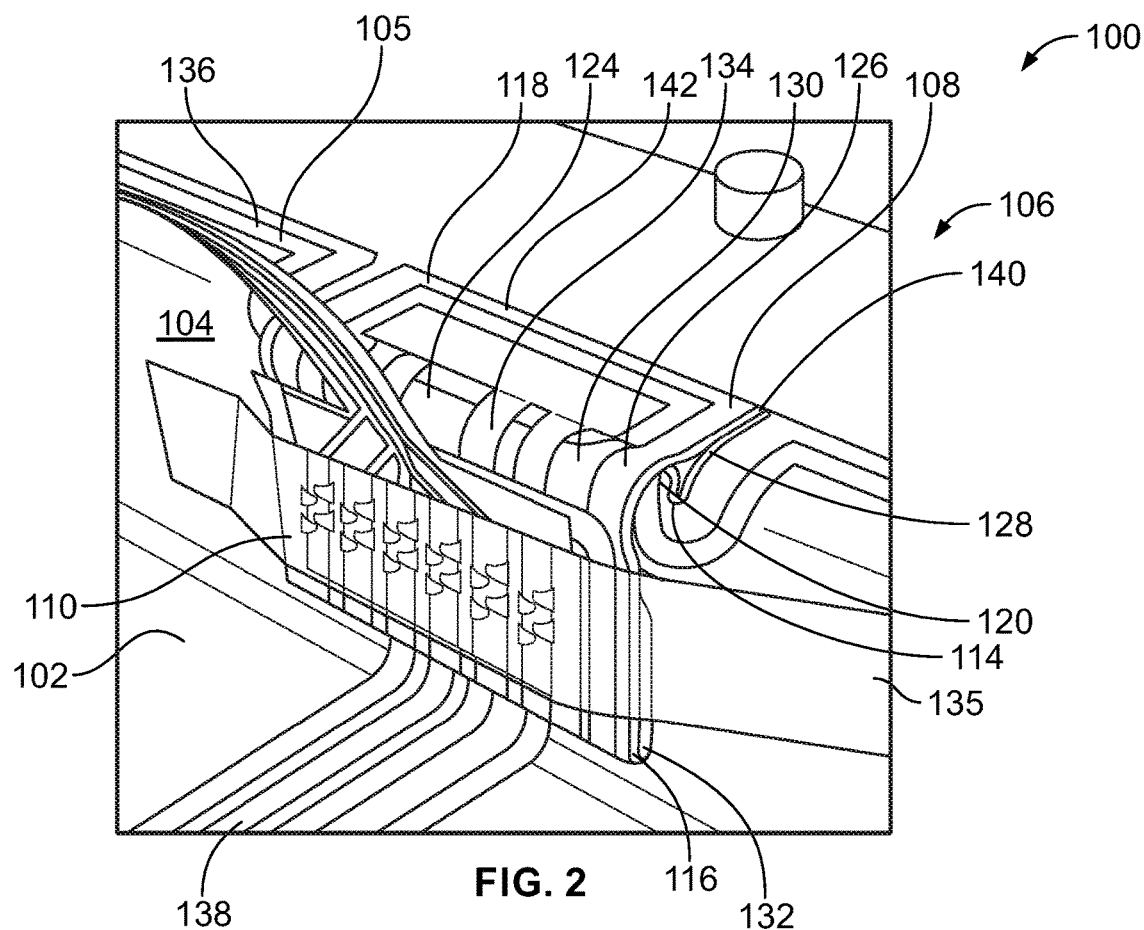
FIG. 2 is a side perspective view of a tamper sensor assembly in accordance with an exemplary embodiment.

FIG. 1 is a top plan view of a tamper sensor assembly 100 formed in accordance with an embodiment when the tamper sensor assembly 100 is in an unfolded condition. FIG. 2 is a side perspective view of the tamper sensor assembly 100 of FIG. 1 in a double folded condition. FIGS. 1-2 illustrate a tamper sensor assembly 100 for a computing device (FIG.

2) that includes a first horizontal surface 102, vertical surface 104, and second horizontal surface 105. The tamper sensor assembly 100 includes a substrate 106 that includes an attachment section 108, a hardware section 110, a protective bulk section 112, a first fold 114 (FIG. 2), and a second fold 116 (FIG. 2).

The substrate 106 extends from a first end 118 that includes the attachment section 108 to a second end 120 that includes the protective bulk section 112. In one example, the substrate 106 is a flexible polyvinylidene fluoride or polyvinylidene difluoride (PVDF) film.

Figure 7:
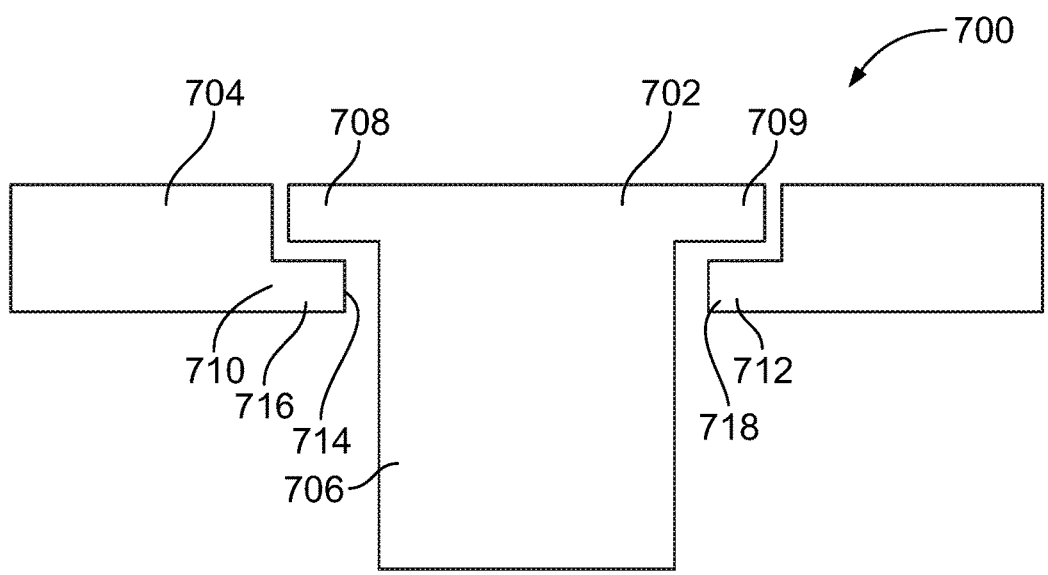
FIG. 7 is a top schematic view of a tamper sensor assembly in accordance with an exemplary embodiment.

The attachment section 108 is positioned at the first end 118 of the substrate 106. When the hardware section 110 if folded over the substrate 106 and then over on itself, the attachment section 108 secures to the protective bulk section 112. In one example the attachment section 108 includes an adhesive strip 122 (FIG. 1) that adheres the attachment section 108 to the protective bulk section 112. Alternatively, the attachment section 108 includes an interlock with the protective bulk section 112 to secure the attachment section 108 and protective bulk section 112. (FIG. 7). In yet another embodiment, an adhesive strip 122 and an interlock are utilized to secure the attachment section 108 to the protective bulk section 112.

The hardware section 110 receives hardware 123 including hardware circuitry 124 and extends from a first end 126 extending from the attachment section 108 to a second end 128 that terminates at the protective bulk section 112. A protective film 130 extends around the hardware 124. The hardware 124 in one embodiment includes flexible circuits allowing the hardware section 110 to be folded upon itself at the second fold 116. When the second fold 116 is provided, a first portion 132 of the hardware section 110 extends from the first end 126 to the second fold 116 while a second portion 134 extends from the second fold 116 to the protective bulk section 112. The second fold 116 in one example embodiment is positioned at a location that results the second portion 134 extending over and engaging along the first portion 132 such that the attachment section 108 secures to the protective bulk section 112. In another example embodiment, the second fold 116 is positioned at a location such that the attachment section 108 secures to a computer component of the computing device. In yet another exemplary embodiment, the second fold 116 is positioned at a location such that the attachment section 108 secures to the first portion 132 of the hardware section 110. In another embodiment an adhesive strip 135 (FIG. 2) is provided to secure the hardware section 110 to the protective bulk section 112 and provide additional protection for the hardware section 110.

The protective bulk section 112 extends from the hardware section 110 at a first end 137 to a second end 138. The protective bulk section 112 includes tamper circuitry 138 disposed therein that is electrically connected to the hardware circuitry 124. In one example, the tamper circuitry 138 is a substrate with a mesh serpentine substrate with a plurality of conductive and insulative layers thereon. Similarly, in one embodiment the substrate is a flexible polyvinylidene fluoride or polyvinylidene difluoride (PVDF) film.

The protective bulk section 112 also includes the first fold 114. The first fold 114 is disposed along an edge 140 of the protective bulk section 112 such that the hardware section 110 engages and/or extends along the protective bulk section 112. The hardware section 110 is folded to provide the second fold 116 such that the second portion 134 of the hardware section 110 engages the first portion 132 of the hardware section 110 and the attachment section 108 engages a lip 142 of the protective bulk section to completely enclose the hardware 123 within the hardware section 110. Specifically, by providing the first fold 114 and second fold 116 that are both 180°, both the first portion 132 of the hardware section 110 engages and/or extends along the protective bulk section 112 while the second portion 134 of the hardware section 110 engages and/or extends along the first portion 132 of the hardware section 110. Thus, the tamper sensor assembly is compact providing improved spatial characteristics and is completely enclosed.

Figure 3:
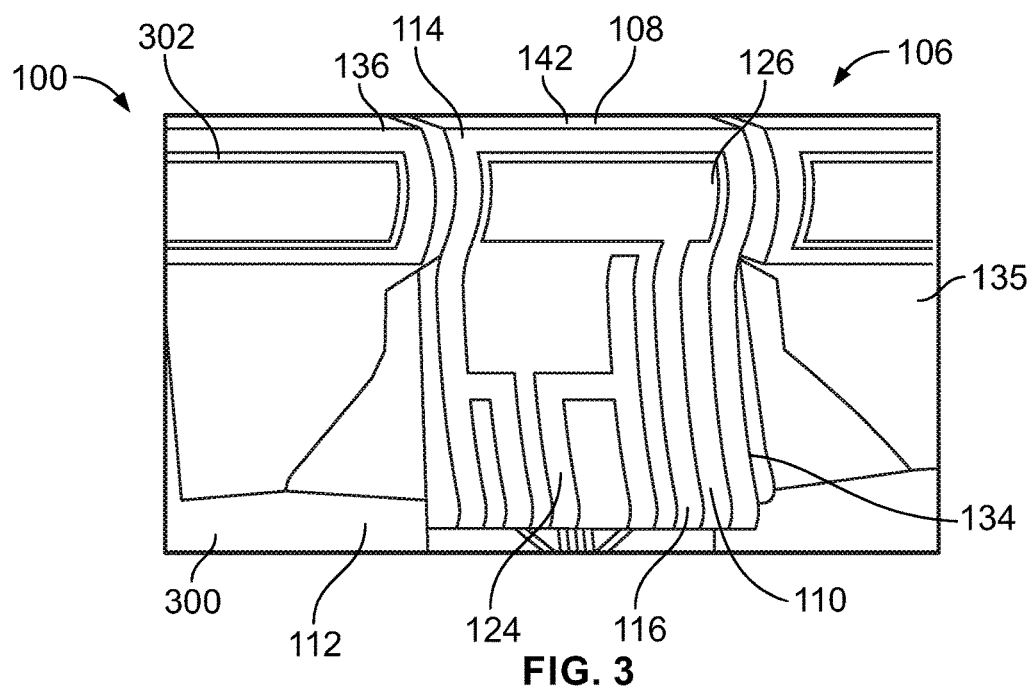
FIG. 3 is a front perspective view of a tamper sensor assembly in accordance with an exemplary embodiment.
Figure 4:
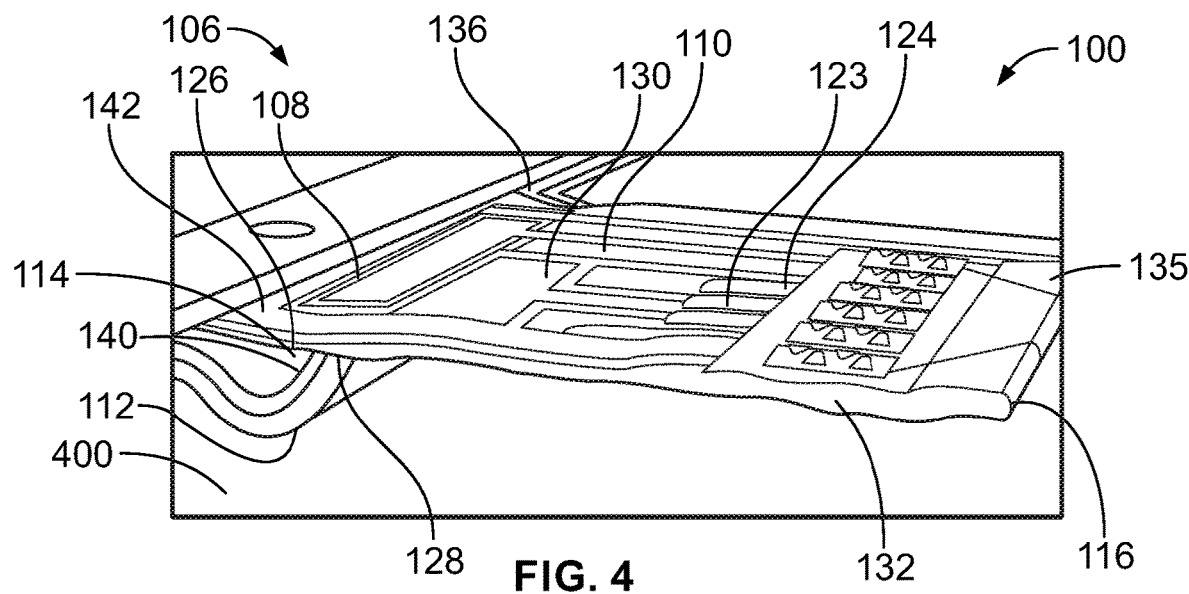
FIG. 4 is a side perspective view of a tamper sensor assembly in accordance with an exemplary embodiment.

FIG. 3 illustrates another exemplary embodiment of a tamper sensor assembly 100. In this exemplary embodiment the tamper sensor assembly 100 is placed such that the hardware section 110 of the tamper sensor assembly 100 engages and/or extends along a horizontal surface 300 instead of a vertical surface 302. FIG. 4 meanwhile illustrates the tamper sensor assembly 100 placed on a horizontal surface 400 without placing the tamper sensor assembly 100 on the vertical surface. As these embodiments illustrate, the tamper sensor may be positioned in differing locations of the computing device and provide the tamper protection desired.

Figure 5:
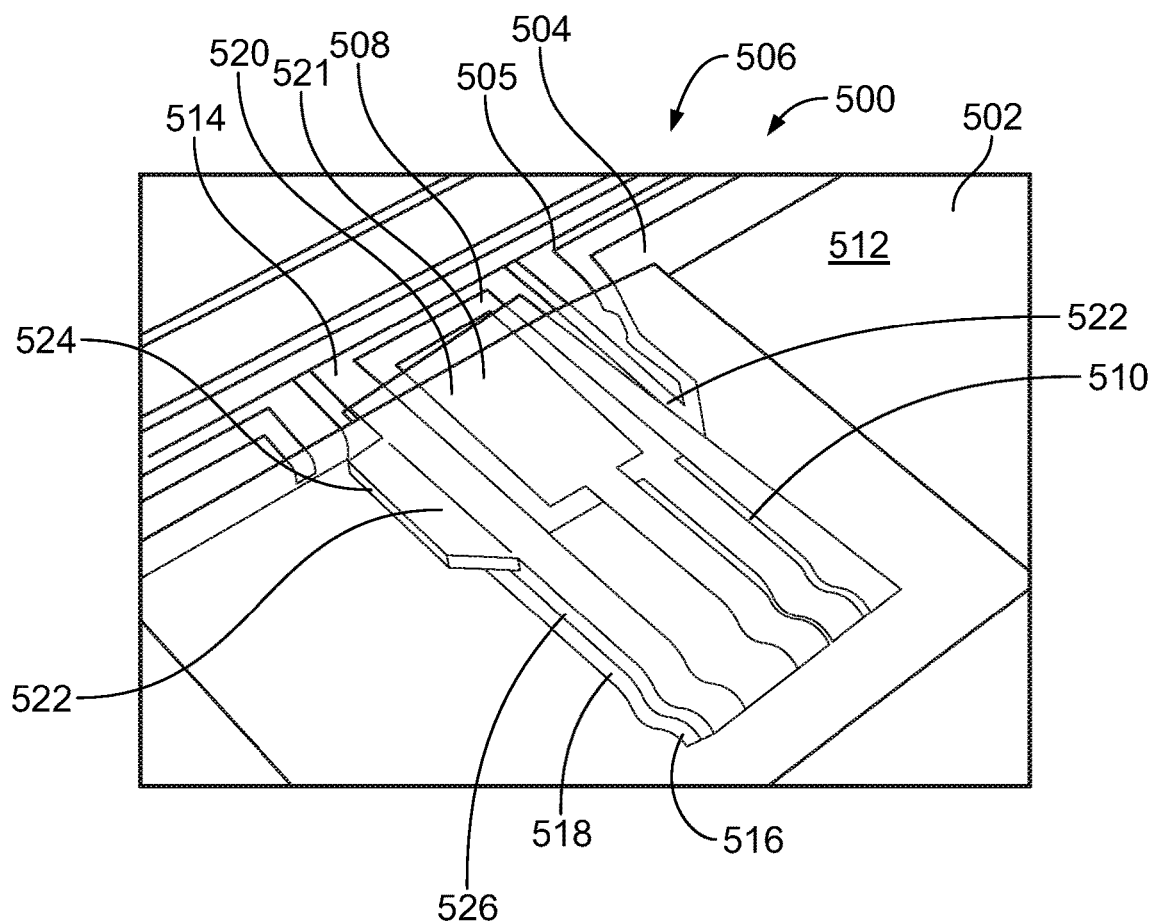
FIG. 5 is a side perspective view of a tamper sensor assembly in accordance with an exemplary embodiment.

FIG. 5 illustrates another exemplary embodiment of a tamper sensor assembly 500. In this embodiment the tamper sensor assembly 500 is also for a computing device that includes a first horizontal surface 502, vertical surface 504, and second horizontal surface 505. The tamper sensor assembly 500 includes a substrate 506 that includes an attachment section 508, a hardware section 510, a protective bulk section 512, a first fold 514, and a second fold 516.

In this embodiment the hardware section 510 includes a first portion 518 and a second portion 520 that extends along the first portion 518, similar to the exemplary embodiment of FIGS. 1 and 2. Also similar to the exemplary embodiments of FIGS. 1 and 2, an adhesive strip 521 adheres the hardware section 510 to the computing device. Extending from the second portion 520 are tab portions 522 that extend outwardly, such that the hardware section 510 includes an outer length or width 524 and an inner length or width 526 that is less the outer length or width 524. The tab portions 522 provide additional protection to prevent tampering of the hardware section 520 from the sides.

Figure 6:
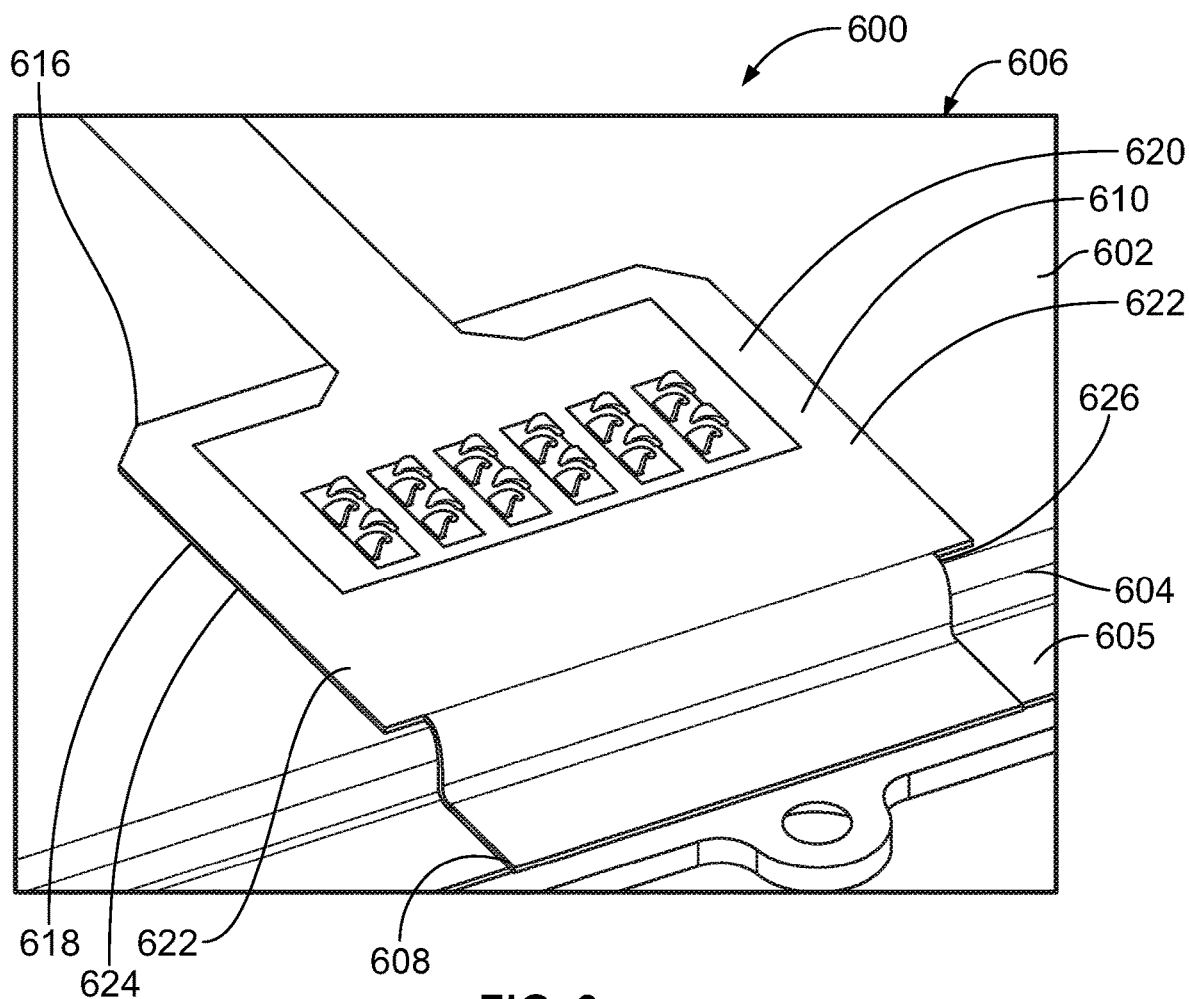
FIG. 6 is a side schematic view of a tamper sensor assembly in accordance with an exemplary embodiment.

FIG. 6 illustrates another exemplary embodiment of a tamper sensor assembly 600. In this embodiment the tamper sensor assembly 600 is also for a computing device that includes a first horizontal surface 602, vertical surface 604, and second horizontal surface 605. The tamper sensor assembly 600 includes a substrate 606 that includes an attachment section 608, a hardware section 610, a protective bulk section (not shown), a first fold (not shown) and a second fold 616.

In this embodiment the hardware section 610 includes a first portion 618 and a second portion 620 such that when the hardware section 610 is folded along the second fold 616 the second portion 620 extends along the first portion 618, similar to the exemplary embodiment of FIGS. 1 and 2. Similar to the example embodiment of FIG. 5, extending from the second portion 620 are tab portions 622 that extend outwardly, such that the hardware section 610 includes an outer length or width 624 and an inner length or width 626 that is less the outer length or width 624. The tab portions 622 provide additional protection to prevent tampering of the hardware section 620 from the sides. In this exemplary embodiment the tab portions 622 extend over a greater area of the hardware section compared to the exemplary embodiment of FIG. 5. Specifically, in the embodiment of FIG. 5 less than half the hardware section 510 is provided as a tab portion, whereas in FIG. 6 more than half the hardware section 610 is provided as a tab portion. Thus, depending on design requirements, the size and shape may be altered to provide more robustness, or improve spatial requirement.

FIG. 7 illustrates an exemplary embodiment in a schematic diagram of an example of a connection point 700 between an example attachment section 702 and a portion of a protective bulk section 704. In this example the attachment section 702 includes an interlocking body 706 that in one example is a T-shaped body with a first flange 708 that extends from the interlocking body 706 and a second flange 709 that extends from the interlocking body 706. At the connection point 700 the protective bulk section 704 includes a first attachment portion 710 and second attachment portion 712 with an opening 714 disposed between. The first attachment portion 710 includes a first flange 716 that aligns and engages the first flange 708 of the attachment section 702, while the second attachment portion 712 includes a second flange 718 that aligns and engages the second flange 709 of the attachment section 702. In this manner, a secure connection is provided between the attachment section 702 and protective bulk section 704 to protect the hardware within a hardware section (not shown) of a tamper sensor assembly. In another example, adhesive is provided between the first flange 716 and the first flange 708 of the attachment section 702 and/or is provided between the second flange 718 and the second flange 709 of the attachment section 702 to provide additional security for the hardware.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A tamper sensor assembly comprising:
    a substrate including:
        a protective bulk section including tamper circuitry;
        a hardware section configured to receive hardware circuitry and extending from the protective bulk section;
        the hardware circuitry electrically connected to the tamper circuitry to alter operation of the hardware circuitry responsive to modification of the tamper circuitry;
        an attachment section extending from the hardware section;
        a first fold in the substrate to position a first portion of the hardware section to extend along the protective bulk section; and
        a second fold in the substrate to position a second portion of the hardware section to extend along the first portion of the hardware section.

2. The tamper sensor assembly of claim 1, wherein the protective bulk section is a mesh substrate.

3. The tamper sensor assembly of claim 2, wherein the mesh substrate includes a flexible polyvinylidene fluoride or polyvinylidene difluoride (PVDF) film.

4. The tamper sensor assembly of claim 3, wherein the flexible mesh substrate further includes conductive layers and insulative layers formed on the flexible PVDF film.

5. The tamper sensor assembly of claim 4, wherein the conductive layers include serpentine layers.

6. The tamper sensor assembly of claim 1, wherein the attachment section includes adhesive that secures the attachment section to the protective bulk section.

7. The tamper sensor assembly of claim 6, wherein the adhesive secures to a lip of the protective bulk section.

8. The tamper sensor assembly of claim 1, wherein the attachment section includes an interlocking body that is matingly received by the protective bulk section to secure the attachment section to the protective bulk section.

9. The tamper sensor assembly of claim 8, wherein the interlocking body is a T-shaped body having a flange that interlocks with a flange of the protective bulk section.

10. A method of manufacturing a tamper sensor assembly comprising:
    layering tamper circuitry on a substrate in a protective bulk bulkhead section of the substrate;
    placing hardware circuitry on the substrate in a hardware section of the substrate;
    connecting the hardware circuitry to the tamper circuitry such that the tamper circuitry alters operation of the hardware circuitry when the tamper circuitry is modified;
    folding the substrate a first time to extend a first portion of the hardware section along the protective bulk bulkhead section of the substrate; and
    folding the substrate a second time to extend a second portion of the hardware section along the first portion of the hardware section of the substrate.

11. The method of claim 10, further comprising:
    adhering an attachment section of the substrate that extends from the hardware section of the substrate, to the protective bulk bulkhead section.

12. The method of claim 10, further comprising:
    interlocking an attachment section of the substrate that extends from the hardware section of the substrate, to the protective bulkhead section.

13. The method of claim 10, wherein the substrate is a polyvinylidene fluoride or polyvinylidene difluoride (PVDF) film.

14. The method of claim 10, wherein the hardware circuitry is a flexible circuit.

15. A tamper sensor assembly comprising:
    a substrate including a protective bulk section having tamper circuitry and a hardware section having hardware circuitry extending from the protective bulk section, wherein the hardware circuitry is altered responsive to modification of the tamper circuitry;
    a protective bulk section fold along an edge of the protective bulk section adjacent the hardware section to engage a first portion of the hardware section against the protective bulk section along a first engagement surface of the hardware section;

a hardware section fold in the hardware section to engage a second portion of the hardware section against the first portion of the hardware section along a second engagement surface of the hardware section opposite the first engagement surface of the hardware section to enclose the first portion of the hardware section.

16. The tamper sensor assembly of claim 15, wherein the substrate includes an attachment section extending from the hardware section that secures to a lip of the protective bulk section to position the hardware section between the lip and the hardware section fold.

17. The tamper sensor assembly of claim 16, wherein the attachment section includes a flange that engages a flange of the protective bulk section.

18. The tamper sensor assembly of claim 15, wherein the protective bulk section is a mesh substrate.

19. The method of claim 11, wherein the attachment section includes adhesive, and during the step of adhering the adhesive is placed into contact with the protective bulk section.

20. The tamper sensor assembly of claim 16, wherein the attachment section includes an adhesive that secures to the lip of the protective bulk section.

* * * * *